(12) United States Patent
Haywood

(10) Patent No.: US 9,459,170 B2
(45) Date of Patent: Oct. 4, 2016

(54) PROCESS FLUID PRESSURE SENSING ASSEMBLY FOR PRESSURE TRANSMITTERS SUBJECTED TO HIGH WORKING PRESSURE

(71) Applicant: Rosemount Inc., Chanhassen, MN (US)

(72) Inventor: Nicholas John Haywood, Chanhassen, MN (US)

(73) Assignee: Rosemount Inc., Chanhassen, MN (US)

( * ) Notice: Subject to any disclaimer, the term of this patent is extended or adjusted under 35 U.S.C. 154(b) by 270 days.

(21) Appl. No.: 14/038,223

(22) Filed: Sep. 26, 2013

(65) Prior Publication Data

US 2015/0082893 A1 Mar. 26, 2015

(51) Int. Cl.

| | | |
|---|---|---|
| *G01L 7/00* | (2006.01) | |
| *G01L 9/00* | (2006.01) | |
| *G01L 15/00* | (2006.01) | |
| *G01L 19/00* | (2006.01) | |
| *G01L 19/06* | (2006.01) | |
| *G01L 19/14* | (2006.01) | |

(Continued)

(52) U.S. Cl.
CPC ............. *G01L 9/0041* (2013.01); *G01L 15/00* (2013.01); *G01L 19/0084* (2013.01); *G01L 19/0645* (2013.01); *G01L 19/143* (2013.01); *G01L 27/007* (2013.01); *G01L 7/082* (2013.01)

(58) Field of Classification Search
CPC ....................... G01L 19/0645; G01L 19/0046; G01L 19/003; G01L 7/082; Y10T 29/49815
USPC .................................. 73/706, 714, 716, 724
See application file for complete search history.

(56) References Cited

U.S. PATENT DOCUMENTS

| | | | | |
|---|---|---|---|---|
| 3,480,036 | A | | 11/1969 | Ehrens et al. ................. 137/318 |
| 4,161,887 | A | * | 7/1979 | Stone ...................... G01L 9/006 338/4 |
| 4,163,395 | A | * | 8/1979 | Medlar ................. G01L 9/0054 73/708 |

(Continued)

FOREIGN PATENT DOCUMENTS

| | | |
|---|---|---|
| CN | 1131462 | 9/1996 |
| CN | 1447096 | 10/2003 |

(Continued)

OTHER PUBLICATIONS

International Search Report and Written Opinion of the International Searching Authority for International Application No. PCT/US2014/052660, dated Mar. 31, 2015.

(Continued)

*Primary Examiner* — Lisa Caputo
*Assistant Examiner* — Jonathan Dunlap
(74) *Attorney, Agent, or Firm* — Westman, Champlin & Koehler, P.A.

(57) ABSTRACT

A pressure measurement assembly is provided. The assembly includes a pressure sensor mount having an aperture therethrough. A pressure sensor passes through and is mounted to the aperture. The pressure sensor has an electrical characteristic that varies with applied pressure. An isolator plug is configured to be exposed to a process fluid. The isolator plug has an isolation diaphragm disposed to contact the process fluid. A passageway is fluidically coupled to the isolation diaphragm to convey process fluid pressure from the isolation diaphragm to the pressure sensor through an incompressible fluid. The pressure sensor mount is coupled to the isolator plug and has a non-circular shape when viewed along an axis of the aperture.

26 Claims, 9 Drawing Sheets

(51) Int. Cl.
*G01L 27/00* (2006.01)
*G01L 7/08* (2006.01)

(56) References Cited

U.S. PATENT DOCUMENTS

| | | | |
|---|---|---|---|
| 4,679,567 A | 7/1987 | Hanlon et al. | 128/675 |
| 4,852,466 A * | 8/1989 | Freeman | G01L 7/082 |
| | | | 73/715 |
| 4,942,383 A | 7/1990 | Lam et al. | 338/42 |
| 4,970,898 A * | 11/1990 | Walish | G01L 19/0038 |
| | | | 73/706 |
| 5,000,047 A | 3/1991 | Kato et al. | |
| 5,022,270 A | 6/1991 | Rud, Jr. | 73/706 |
| 5,212,989 A | 5/1993 | Kodama et al. | 73/706 |
| 5,396,802 A * | 3/1995 | Moss | G01B 7/14 |
| | | | 336/30 |
| 5,463,904 A | 11/1995 | Kalinoski | 73/719 |
| 5,524,492 A | 6/1996 | Frick et al. | 73/706 |
| 5,637,802 A | 6/1997 | Frick et al. | 73/724 |
| 5,665,899 A | 9/1997 | Willcox | 73/1.63 |
| 5,668,322 A | 9/1997 | Broden | 73/756 |
| 5,670,722 A * | 9/1997 | Moser | G01L 19/0084 |
| | | | 73/718 |
| 5,680,109 A | 10/1997 | Lowe et al. | 340/608 |
| 5,709,337 A * | 1/1998 | Moser | G01L 19/0084 |
| | | | 228/124.6 |
| 5,731,522 A | 3/1998 | Sittler | 73/708 |
| 6,038,961 A | 3/2000 | Filippi et al. | 92/98 |
| 6,050,145 A * | 4/2000 | Olson | G01L 19/0084 |
| | | | 73/706 |
| 6,079,276 A | 6/2000 | Frick et al. | 73/718 |
| 6,082,199 A | 7/2000 | Frick et al. | 73/724 |
| 6,089,097 A | 7/2000 | Frick et al. | 73/718 |
| 6,151,557 A | 11/2000 | Broden et al. | 702/47 |
| 6,253,624 B1 | 7/2001 | Broden et al. | 73/861.44 |
| 6,354,152 B1 | 3/2002 | Herlik | 73/597 |
| 6,425,290 B2 | 7/2002 | Willcox et al. | 73/715 |
| 6,457,367 B1 | 10/2002 | Behm et al. | 73/753 |
| 6,473,711 B1 | 10/2002 | Sittler et al. | 702/138 |
| 6,480,131 B1 | 11/2002 | Roper et al. | 341/155 |
| 6,484,585 B1 | 11/2002 | Sittler et al. | 73/718 |
| 6,505,516 B1 | 1/2003 | Frick et al. | 73/718 |
| 6,508,129 B1 | 1/2003 | Sittler | 73/756 |
| 6,516,671 B2 | 2/2003 | Romo et al. | 73/718 |
| 6,520,020 B1 | 2/2003 | Lutz et al. | 73/706 |
| 6,561,038 B2 | 5/2003 | Gravel et al. | 73/729.2 |
| 6,568,274 B1 * | 5/2003 | Lucas | G01L 19/04 |
| | | | 73/718 |
| 6,662,662 B1 * | 12/2003 | Nord | G01L 19/0618 |
| | | | 73/715 |
| 6,722,927 B1 | 4/2004 | Eriksen | 439/736 |
| 6,843,139 B2 | 1/2005 | Schumacher et al. | 73/861.52 |
| 6,848,316 B2 | 2/2005 | Sittler et al. | 73/706 |
| 6,901,803 B2 * | 6/2005 | Fandrey | G01L 19/0007 |
| | | | 73/706 |
| 6,966,229 B2 | 11/2005 | Seeberg | 73/754 |
| 7,000,478 B1 | 2/2006 | Zwollo et al. | |
| 7,036,381 B2 | 5/2006 | Broden et al. | 73/708 |
| 7,290,452 B2 * | 11/2007 | Hedtke | F16J 3/02 |
| | | | 277/317 |
| 7,409,867 B2 | 8/2008 | Toy | 73/715 |
| 7,458,275 B2 * | 12/2008 | Kleven | G01L 19/003 |
| | | | 73/745 |
| 7,624,642 B2 | 12/2009 | Romo | 73/717 |
| 7,819,014 B1 | 10/2010 | Broden | 73/718 |
| 7,937,989 B2 | 5/2011 | Marchesi | 73/299 |
| 7,962,294 B2 | 6/2011 | Dozoretz et al. | 702/50 |
| 8,122,771 B2 | 2/2012 | Seeberg et al. | 73/756 |
| 8,578,783 B2 | 11/2013 | Hedtke et al. | 73/753 |
| 8,984,948 B2 * | 3/2015 | Becher | F15B 3/00 |
| | | | 73/714 |
| 2002/0003917 A1 | 1/2002 | Sherrer | 385/12 |
| 2002/0023499 A1 | 2/2002 | Boehler et al. | |
| 2002/0100333 A1 | 8/2002 | Gravel et al. | 73/756 |
| 2003/0117837 A1 | 6/2003 | Park et al. | 365/158 |
| 2003/0177837 A1 | 9/2003 | Broden et al. | 73/716 |
| 2005/0193825 A1 | 9/2005 | Otsuka | 73/715 |
| 2005/0248434 A1 | 11/2005 | Kurtz et al. | 338/42 |
| 2006/0162458 A1 | 7/2006 | Broden | |
| 2006/0236775 A1 * | 10/2006 | Mei | G01L 9/0072 |
| | | | 73/724 |
| 2008/0006094 A1 | 1/2008 | Schulte et al. | 73/736 |
| 2008/0053242 A1 | 3/2008 | Schumacher | 73/861.42 |
| 2008/0110269 A1 | 5/2008 | Strietzel | 73/718 |
| 2008/0245158 A1 | 10/2008 | Hedtke | |
| 2009/0000393 A1 | 1/2009 | Nyfors et al. | 73/861.19 |
| 2009/0165424 A1 | 7/2009 | Lutz | |
| 2009/0249882 A1 | 10/2009 | Kraatz | 73/708 |
| 2009/0293625 A1 | 12/2009 | Sundet et al. | 73/708 |
| 2010/0064816 A1 | 3/2010 | Filippi | 73/715 |
| 2010/0198547 A1 | 8/2010 | Mulligan et al. | 702/100 |
| 2010/0281994 A1 * | 11/2010 | Brown | G01L 19/0645 |
| | | | 73/729.1 |
| 2011/0247425 A1 | 10/2011 | Moldenhauer | 73/753 |
| 2012/0006119 A1 * | 1/2012 | Broden | G01F 1/383 |
| | | | 73/716 |
| 2012/0046870 A1 | 2/2012 | Lievois et al. | 702/12 |
| 2012/0079884 A1 | 4/2012 | Broden et al. | 73/717 |
| 2013/0047737 A1 | 2/2013 | Vagle | 73/716 |
| 2013/0068029 A1 | 3/2013 | Romo | 73/706 |
| 2013/0074604 A1 | 3/2013 | Hedtke et al. | |
| 2013/0160560 A1 | 6/2013 | Strei et al. | 73/706 |
| 2013/0167961 A1 * | 7/2013 | Becher | F15B 3/00 |
| | | | 138/30 |
| 2013/0233058 A1 * | 9/2013 | Breen | G01F 1/44 |
| | | | 73/49.8 |
| 2014/0041437 A1 | 2/2014 | Hedtke | 73/1.57 |
| 2014/0083171 A1 * | 3/2014 | Strei | G01L 19/06 |
| | | | 73/49.8 |
| 2014/0213103 A1 | 7/2014 | Ohmeyer et al. | 439/571 |
| 2014/0260644 A1 | 9/2014 | Sahagen | 73/708 |
| 2014/0298914 A1 * | 10/2014 | Vagle | G01L 19/00 |
| | | | 73/716 |
| 2015/0000417 A1 | 1/2015 | Hedtke et al. | 73/724 |
| 2015/0260633 A1 | 9/2015 | Hedtke | 73/862.637 |

FOREIGN PATENT DOCUMENTS

| | | |
|---|---|---|
| CN | 1777790 | 5/2006 |
| CN | 101802581 | 8/2010 |
| CN | 102162762 | 8/2011 |
| CN | 102356307 | 2/2012 |
| CN | 103017969 | 4/2013 |
| CN | 203069314 | 7/2013 |
| DE | 10 2010 041 170 | 3/2011 |
| EP | 1 116 943 | 6/2013 |
| JP | 02-141635 | 5/1990 |
| JP | 10-096656 | 4/1998 |
| JP | 10-160530 | 6/1998 |
| JP | 2002-022586 | 1/2002 |
| JP | 2011-123011 | 6/2011 |
| WO | WO 95/08759 | 3/1995 |
| WO | WO 01/61219 | 8/2001 |
| WO | WO 2010/141655 | 12/2010 |
| WO | WO 2011/000423 | 1/2011 |

OTHER PUBLICATIONS

Office Action from Chinese Application No. 201210506130.3, dated Jan. 14, 2015.
Product Data Sheet 00813-0100-4716, Rev. LA, Rosemount 3095 MultiVariable "The Proven Leader in Multivariable Mass Flow Measurement", dated Dec. 31, 2008.
Notification of Transmittal of the International Searching Report and the Written Opinion of the International Searching Authority from PCT/US2014/049019, dated Jan. 20, 2015.
"Application of Hardgrove Alloy C-276 Material in Chemical Pressure Vessel", by Li, Petrochemical Design, Col. 20, No. 1, pp. 36-38, Dec. 31, 2003.
Office Action from Australian Application No. 2012359068, dated Jul. 15, 2014.
Office Action from Chinese Application No. 2012105061303, dated Jun. 10, 2014.

(56) References Cited

OTHER PUBLICATIONS

Office Action from European Application No. 12809549.4, dated Jul. 29, 2014.
International Search Report and Written Opinion of the International Searching Authority dated Jun. 5, 2013 for International Application No. PCT/US2012/070545, filed Dec. 19, 2012.
General Specifications EJX110A Differential Pressure Transmitter, Jan. 1, 2009. Retrieved from Internet : http://web.archive.org/web/20090407093933/http://www.yokogawa.com/fld/pdf/ejx/GS01C25B01-01E.pdf.
Hibner, E.L. and L.E. Shoemaker "The Advantages of Nickel Alloys for Seawater Service, a New Generation of High Strength, Corrosion-Resistant Superalloy Products for Military Springs, Fasteners and Hardware". Special Metals Corporation, Huntington, WV 25705.
Fuji Electric—Differential Presure Transmitters for the Oil and Gas Industry. www.offshore-technology.com/contractors/instrumentation/fuji-electric/fuji-electric1.html.
Office Action from U.S. Appl. No. 13/630,547, dated Aug. 22, 2014.
Invitation to Pay Additional Fees for International Application No. PCT/US2014/052660, dated Dec. 18, 2014.
International Search Report and Written Opinion of the International Searching Authority for International Application No. PCT/US2014/040632, dated Dec. 3, 2014.
Invitation to Pay Additional Fees for International Application No. PCT/US2013/029064, dated Apr. 16, 2014.
International Search Report and Written Opinion of the International Searching Authority for International Application No. PCT/US2013/029064, dated May 28, 2014.
Patent Examination Report No. 1 for Australian Patent Application No. 2013230135, dated Nov. 26, 2014, 3 pages.
Communication pursuant to Rules 161(1) and 162 EPC for European Patent Application No. 13710942.7-1610, dated Dec. 2, 2014, 2 pages.
Office Action from Australian Patent Application No. 2013230135, dated Apr. 2, 2015.
Office Action from U.S. Appl. No. 14/037,805, dated Jun. 15, 2015.
Office Action from Chinese Application Serial No. 201380007242.7, dated Apr. 28, 2015.
Office Action from Japanese Application Serial No. 2014-561027, dated Aug. 25, 2015.
"Corrosion Resistance of Hastelly Alloys", Haynes International, Inc., 1984, pp. 1-4 and 45.
Invitation to Pay Additional Fees along with Annex to Form PCT/ISA/206 Results of the Partial International Search from PCT/US2015/048821, dated Nov. 12, 2015.
Office Action from Canadian Patent Application No. 2,866,380, dated Nov. 4, 2015.
Office Action from Russian Patent Application No. 2014140187, dated Nov. 9, 2015.
Office Action from U.S. Appl. No. 14/785,175, dated Sep. 16, 2015.
Office Action from U.S. Appl. No. 13/930,583, dated Feb. 1, 2016.
Office Action from Japanese Patent Application No. 2014-561027, dated Jan. 19, 2016.
Office Action from Chinese Patent Application No. 201410012367.5, dated Jan. 20, 2016.
International Search Report and Written Opinion of the International Searching Authority for International Application No. PCT/US2015/048821, dated Mar. 18, 2016.
Office Action from U.S. Appl. No. 14/501,934, dated Mar. 21, 2016.
Communication from European Patent Application No. 14734346.1, dated Feb. 4, 2016.
Communication from European Patent Application No. 14761526.4, dated May 4, 2016.
Office Action from Chinese Patent Application No. 201410363633.9, dated Jun. 13, 2016.

* cited by examiner

PROCESS FLUID PRESSURE SENSING ASSEMBLY FOR PRESSURE TRANSMITTERS SUBJECTED TO HIGH WORKING PRESSURE

BACKGROUND

Industrial process control systems are used to monitor and control industrial processes used to produce or transfer fluids or the like. In such systems, it is typically important to measure process variables such as temperatures, pressures, flow rates, levels, and others. Process control transmitters measure such process variables and transmit information related to the measured process variable back to a central location such as a central control room.

One type of process variable transmitter is a pressure transmitter which measures process fluid pressure and provides an output related to the measured pressure. This output may be a pressure, a flow rate, a level of a process fluid, or other process variable that can be derived from the measured pressure. The pressure transmitter is configured to transmit information related to the measured pressure back to the central control room. Transmission is typically provided over a two-wire process control loop, however, other communication techniques are sometimes used.

One particularly challenging environment for pressure measurement is applications which have very high working pressure. One such application is the subsea environment. In such applications, the static pressure to which the process equipment is exposed can be quite high. Moreover, the process fluid can corrode many known metals. For example, some subsea applications are now being considered that require a 20,000 psi maximum working pressure (MWP). Such considerations typically require specialized high-performance, high-cost exotic materials in order to provide a robust structure. Examples of such high-performance, high-cost corrosion-resistant alloys include Hastelloy® C-276 available from Haynes International, Inc. of Kokomo, Ind. or Inconel® 625 available from Special Metals Corporation of New Hartford, N.Y. While the selection of such exotic alloys can allow process variable transmitters to operate in such hostile environments, they do typically increase the cost of the overall structure.

SUMMARY

A pressure measurement assembly is provided. The assembly includes a pressure sensor mount having an aperture therethrough. A pressure sensor passes through and is mounted to the aperture. The pressure sensor has an electrical characteristic that varies with applied pressure. An isolator plug is configured to be exposed to a process fluid. The isolator plug has an isolation diaphragm disposed to contact the process fluid. A passageway is fluidically coupled to the isolation diaphragm to convey process fluid pressure from the isolation diaphragm to the pressure sensor through an incompressible fluid. The pressure sensor mount is coupled to the isolator plug and has a non-circular shape when viewed along an axis of the aperture.

DETAILED DESCRIPTION OF ILLUSTRATIVE EMBODIMENTS

Figure 1:
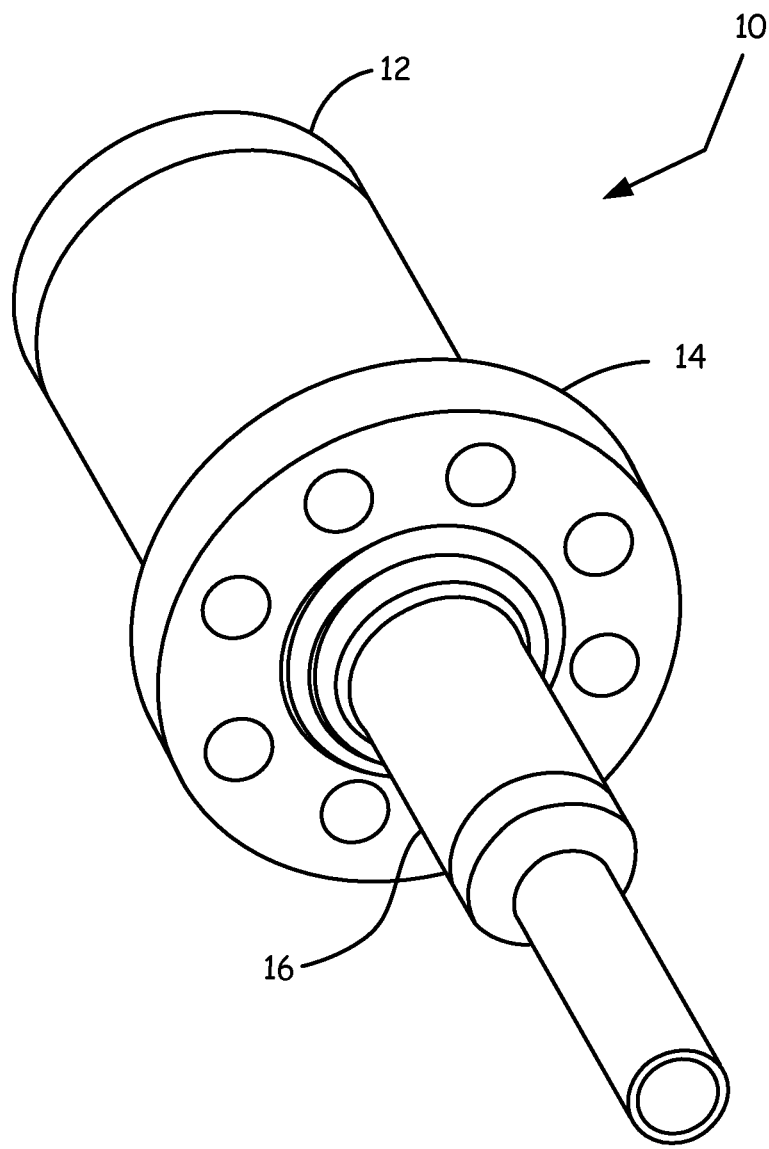
FIG. 1 is a diagrammatic perspective view of a subsea PT (pressure/temperature) transmitter with which embodiments of the present invention can be practiced.

FIG. 1 is a diagrammatic perspective view of an exemplary subsea PT (pressure/temperature) transmitter. Transmitter 10 includes electronics housing 12, API (American Petroleum Institute) pipe flange 14, and pressure/temperature probe 16. Probe 16 is inserted into an opening through a pipe wall and positions either one or two pressure/temperature isolating diaphragms within the pipe. Generally, these diaphragms are positioned at the inside diameter of the pipe, where the process pressure is measured. Based on available known subsea transmitters, typical probes range in diameter from 36.5 mm to 46.5 mm and are generally constructed of high-performance, high-cost corrosion resistant alloys such as Hastelloy® C-276 or Inconel® 625. These alloys are suited for the subsea environment, but generally add to the cost of the overall assembly. Given the high pressures involved in many applications, the size of pipe flange 14 as well as electronics housing 12 is generally driven by the outside diameter of probe 16. A key component of probe assembly 16 is a pressure capsule within probe 16. The pressure capsule generally contains the pressure sensor, a process fluid isolation diaphragm that contacts the process fluid and conveys the process fluid pressure to the pressure sensor without allowing the process fluid to contact the pressure sensor. In addition to a pressure sensor, the capsule can include a temperature sensor. The capsule also generally includes a process interface, such as a screen, and a hydraulic system (such as fill fluid) for transferring the process pressure to the pressure sensor. As shown in FIG. 1, API flange mount 14 includes 8 bolt holes sized to pass bolts that engage the pipe flange in order to mount transmitter 10 to a pipe. Given the pressures involved, the size and thickness of flange 14 is not insubstantial.

Figure 2:
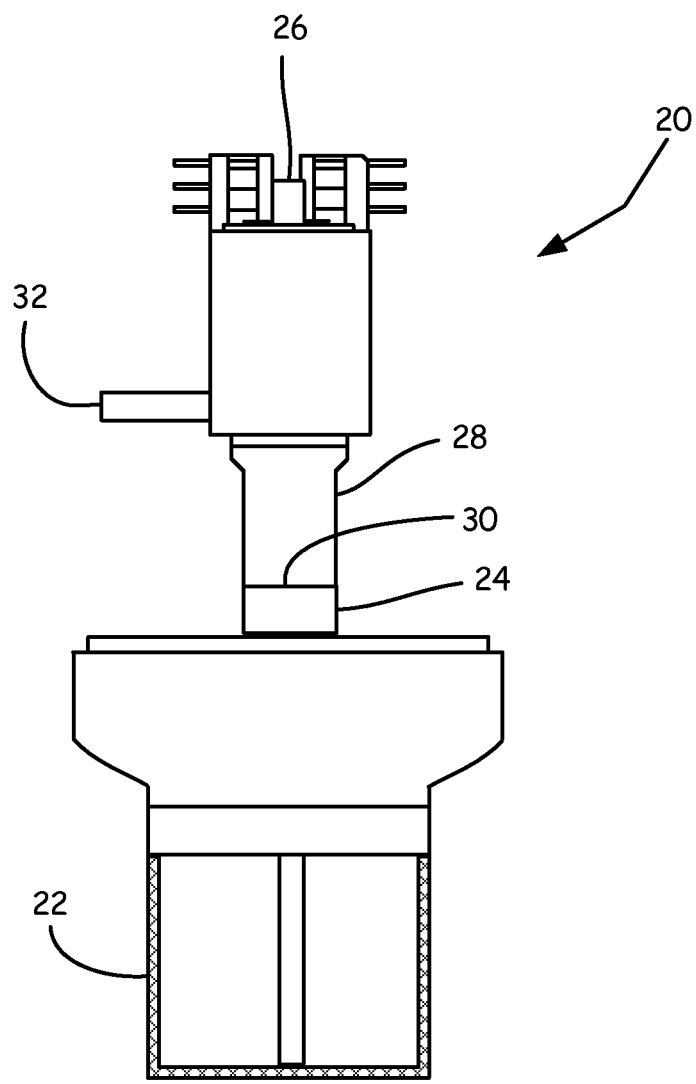
FIG. 2 is a diagrammatic elevation view of a pressure sensor module that is generally used within the probe depicted in FIG. 1.

FIG. 2 is a diagrammatic elevation view of a pressure sensor module that is generally used within probe 16 (shown in FIG. 1). Sensor module 20 includes a screen 22 that is adapted for exposure to the process fluid and that protects an internal component of sensor module 20 such as isolation diaphragm 64 shown in FIG. 8 from particulates and other solid materials in the process fluid. An isolator plug 24 is configured to be exposed directly to process fluid and to physically isolate pressure sensor 26 from the process fluid while still conveying the process fluid pressure to pressure sensor 26. Isolator plug 24 is generally welded to sensor body 28 at weld 30. The way in which the isolator plug conveys process fluid pressure to pressure sensor 26 without allowing physical contact between the process fluid and pressure sensor is by using a hydraulic fill fluid (i.e. incompressible fluid), such as silicone oil. The hydraulic fill fluid is introduced into a closed system via fill tube 32, which is then sealed. Process fluid then bears against one side of an isolation diaphragm, while the other side bears against the hydraulic fill fluid. The fill fluid then conveys the pressure to pressure sensor 26. In this way, pressure sensor 26 only contacts with the hydraulic fill fluid, and not the potentially corrosive, hot, or otherwise challenging process fluid. In some instances, pressure sensor 26 is a small, single-crystal pressure sensor that is able to withstand high pressure and temperatures. In some instances, this single-crystal pressure sensor is formed of sapphire. These single-crystal pressure sensors are known. For example, U.S. Pat. No. 6,520,020 discloses such a sensor. The compression of the single-crystal substrate causes a change in the distance between two or more layers of the single-crystal material of the pressure sensor. Conductors deposited on the inside surfaces of the pressure sensor are thus moved either toward or away from one another thereby changing a capacitance between such conductors. This change in capacitance is detected by suitable circuitry in electronics housing 12 and related to the pressure. In many instances, the single-crystal pressure sensor will also contain a temperature sensitive structure, such as a resistance temperature device. Thus, this small pressure/temperature sensing element can form a small, highly robust, sensing system suitable for relatively hostile environments.

Figure 3:
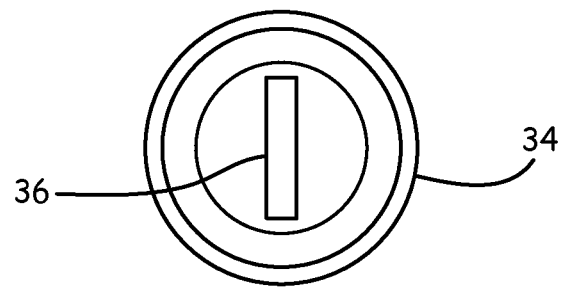
FIG. 3 is a top plan view of a sensor mount for mounting a single-crystal material pressure sensor in accordance with the prior art.

FIG. 3 is a top plan view of a sensor mount for mounting a single-crystal material pressure sensor in accordance with the prior art. Sensor mount 34 is circular and generally has a diameter of 0.279" (7.09 mm). Centered within sensor mount 34, a slot 36 is sized to receive a single-crystal pressure sensor having a rectangular cross section. When the pressure sensor is so mounted within slot 36, a braze or solder operation is performed to mechanically affix or otherwise mount pressure sensor 26 to sensor mount 34.

Figure 4:
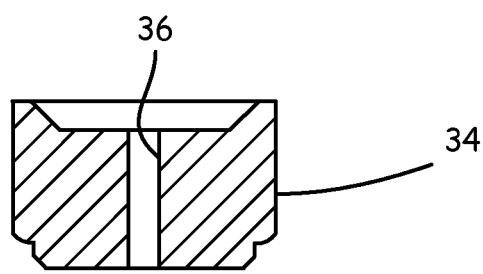
FIG. 4 provides a cross sectional elevation view of the sensor mount shown in FIG. 3.

FIG. 4 provides a cross sectional elevation view of sensor mount 34. In FIG. 4, the height of sensor mount 34 is indicated as being approximately 0.170" (4.32 mm). Further, slot 36 is shown extending completely through sensor mount 34.

In accordance with embodiments of the present invention, the shape of the sensor mount is modified to a non-circular configuration which allows a more compact sensor mounting arrangement while still providing an exceptionally robust sensor mount.

Figure 5:
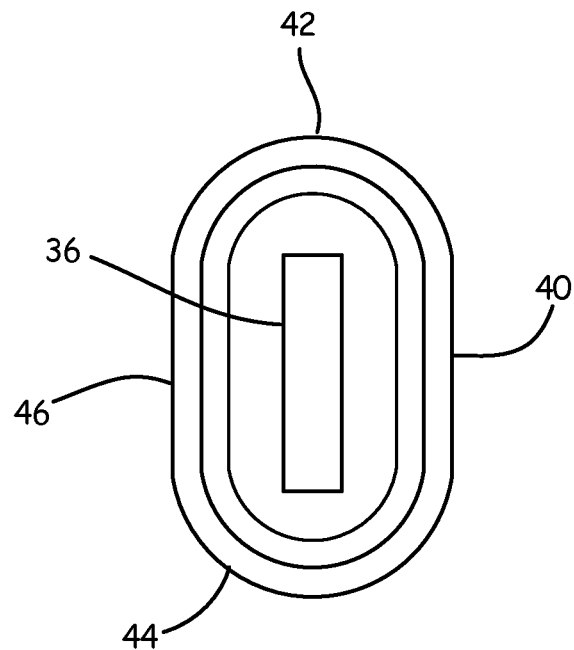
FIG. 5 is a top plan view of a non-circular sensor mount in accordance with an embodiment of the present invention.

FIG. 5 is a diagrammatic top plan view of a sensor mount in accordance with a non-circular sensor mount in accordance with an embodiment of the present invention. The sensor mount 40 still includes slot or aperture 36 that is sized and shaped to receive and mount a single-crystal pressure sensor such as those currently used, or which may later be developed. However, sensor mount 40 has a non-circular shape when viewed along an axis of aperture 36 (i.e. as shown in FIG. 5 looking down through aperture 36). In one embodiment, sensor mount 40 includes a pair of curved ends 42, 44 that are separated from one another by elongated portion 46. In this way, the top plan view of sensor mount 40 resembles an oval or race track. In one embodiment, the width of the oval is about 0.170" (4.32 mm) and the length of the oval is about 0.279" (7.09 mm). While, the embodiment illustrated with respect to FIG. 5 shows elongated portion 46 having straight lines between curved ends 42, 44, some slight curving in elongated portion 46 is allowed as long as the overall shape is non-circular. By departing from the circular shape, additional space is provided for other components, such as a fill tube, which will be described in greater detail with respect to FIGS. 7 and 8.

Figure 6:
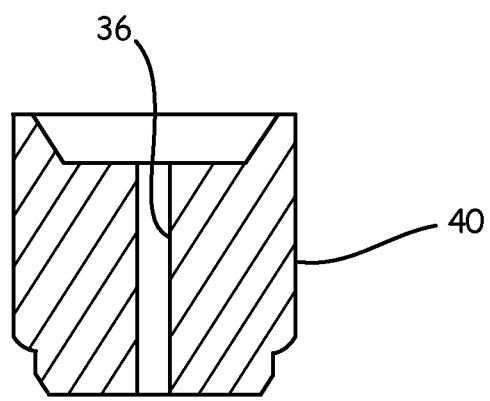
FIG. 6 is a diagrammatic cross-sectional view of the sensor mount shown in FIG. 5

FIG. 6 indicates sensor mount 40, like sensor mount 34, has slot 36 extending completely therethrough and preferably has the same height 0.170 inches, in one embodiment, as sensor mount 34.

Figure 7:
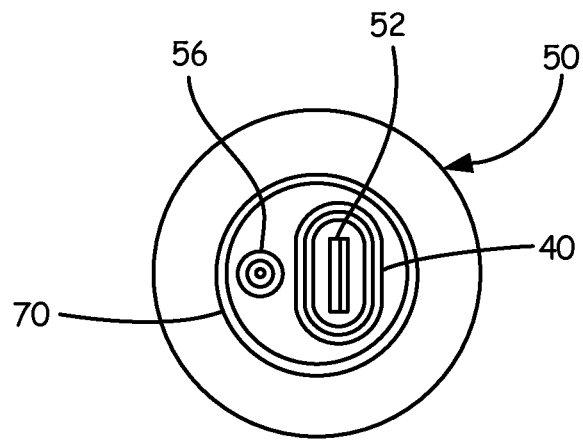
FIG. 7 is a top plan view of an isolator plug having a non-circular sensor mount in accordance with an embodiment of the present invention.

FIG. 7 is a top plan view of an isolator plug 50 having a non-circular pressure sensor mount 40 brazed or otherwise affixed thereto in accordance with an embodiment of the present invention. Sensor mount 40 has pressure sensor 52 mounted therein. Pressure sensor 52 is preferably constructed of a single-crystal material, such as sapphire. Pressure sensor 52 is mounted to sensor mount 40 by with a braze or solder joint. When so mounted, sensor mount 40 disposes pressure sensor 52 within pressure sensing chamber 54 (shown in FIG. 8). Process fluid pressure is conveyed through an isolation fluid from isolation diaphragm 64 to pressure sensor 52 such that pressure sensor 52 can sense the pressure of the process fluid. Preferably, pressure sensor 52 also includes at least one temperature sensitive element thereby also providing an indication of process fluid temperature. The fill fluid is introduced into the space between the isolation diaphragm and the pressure sensing chamber 54 via oil fill tube 56. Oil fill tube 56, in one embodiment, extends from isolator plug 50 in a direction (i.e. vertically) that is substantially parallel with the axis of the aperture through which pressure sensor 52 is mounted. This provides a very compact arrangement for the pressure sensing assembly. Once the system is filled with the oil, oil fill tube 56 is sealed such that a closed volume is maintained.

Figure 8:
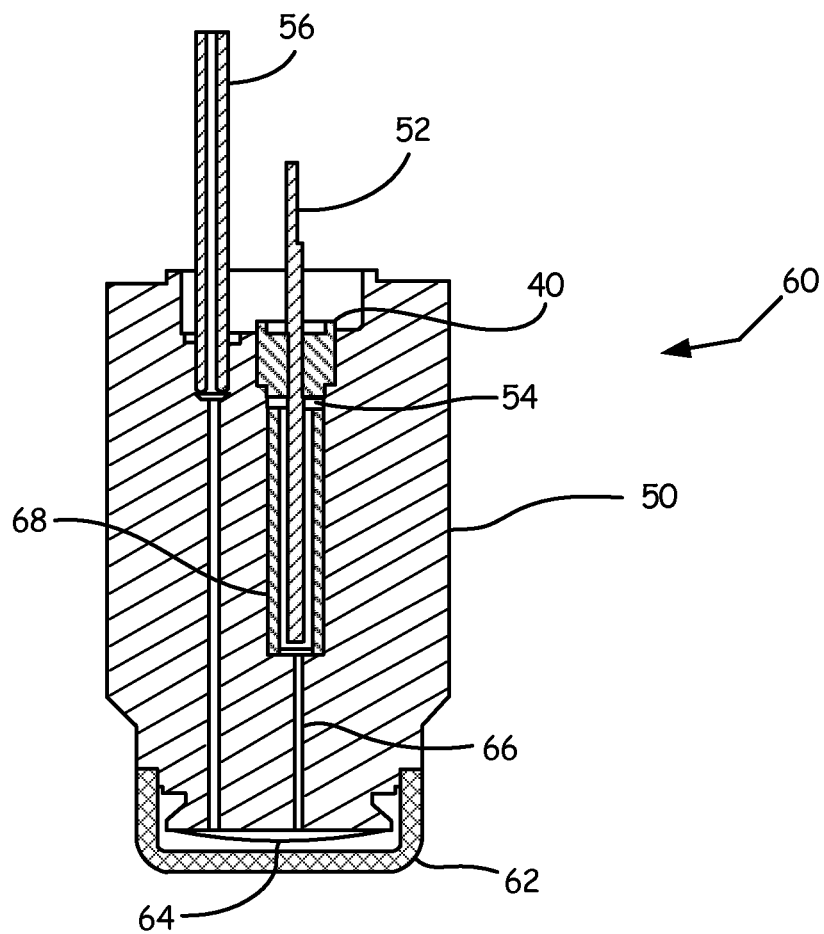
FIG. 8 is a diagrammatic cross sectional view of a pressure sensing assembly portion of a pressure probe in accordance with an embodiment of the present invention.

FIG. 8 is a diagrammatic cross sectional view of a pressure sensing assembly of a pressure probe in accordance with an embodiment of the present invention. Assembly 60 includes a screen 62, or other suitable structure that is disposed proximate isolation diaphragm 64 such that particulates or solids moving in the process fluid do not physically contact the isolation diaphragm. However, screen 62 does include a number of apertures that allow the process fluid to access isolation diaphragm 64. As process fluid exerts a pressure against isolation diaphragm 64, the fill fluid within the closed system conveys the process fluid pressure through oil passage 66 to pressure sensing chamber 54. In some embodiments, pressure sensing chamber 54 includes one or more oil volume inserts 68 that are substantially incompressible and reduce the amount of oil volume required in pressure sensing chamber 54. As the fill fluid is pressurized by the process fluid, opposing layers of pressure sensor 52 are urged toward one another based upon the pressure. The displacement of opposite layers of pressure sensor 52 causes a change in the distance between the layers. Metallizations or conductive layers disposed on the internal surfaces of such layers form capacitive plates such that a capacitor is provided having a capacitance that varies with the applied pressure.

As shown in FIG. 8, pressure sensor 52 is mounted to sensor mount 40, which is preferably brazed to isolator plug 50. Thus, the features of the sensor mount and isolator plug are combined into a single-piece isolator plug. By combining the features, the requisite deep penetration weld between sensor body 28 and isolator plug 24 is eliminated and the overall height and diameter of assembly 60 is reduced. Existing processes and materials can be used to braze or solder sensor mount 40, pressure sensor 52 and oil fill tube 56 into isolator plug 50.

Referring back to FIG. 7, by utilizing a non-circular sensor mount 50, in conjunction with the vertical oil fill tube 56, both structures can exist within the perimeter of ring 70. This allows the overall diameter of the assembly to be reduced thus minimizing the entire structure, which also reduces the amount of high-performance, high-cost alloys required to manufacture the probe.

Figure 9:
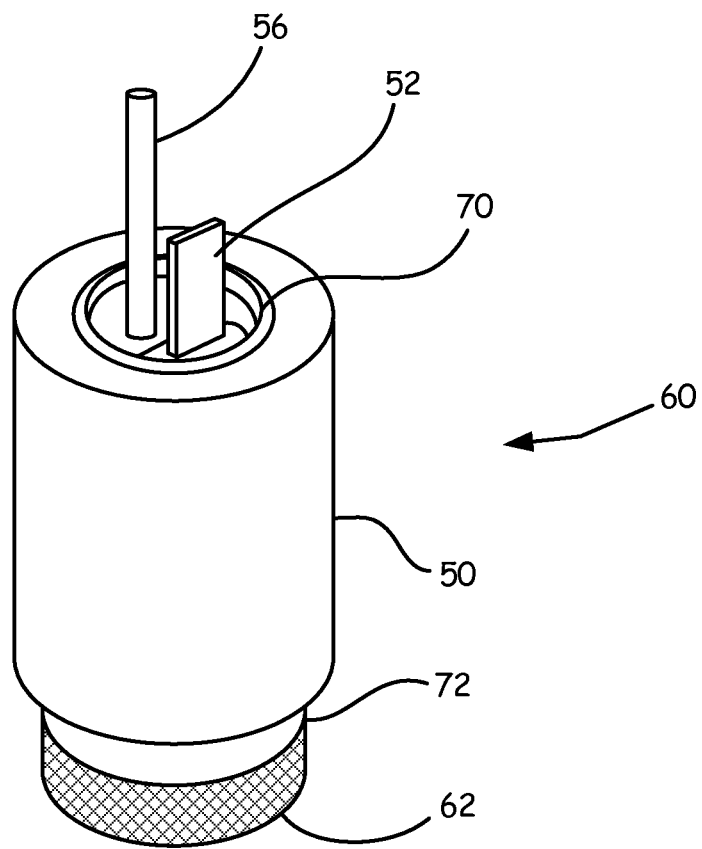
FIG. 9 is a diagrammatic perspective view of the assembly depicted in FIG. 8.

FIG. 9 is a diagrammatic perspective view of pressure sensing system 60 showing both pressure sensor 52 and oil tube 56 being disposed within the perimeter of ring 70. Additionally, screen 62 is shown welded to isolator plug 50 at weld 72.

Figure 10:
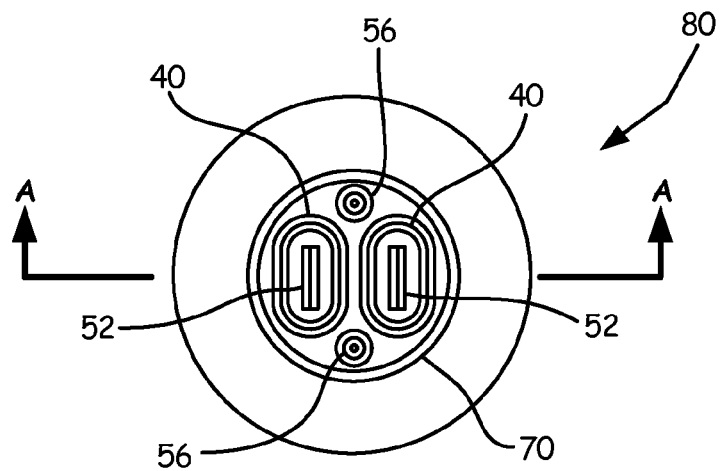
FIG. 10 is a top plan view of a pressure sensing assembly having non-circular sensor mounts in accordance with another embodiment of the present invention.

FIG. 10 is a top plan view of a pressure sensing assembly 80 in accordance with another embodiment of the present invention. Pressure sensing assembly 80 bears some similarity to pressure sensing assembly 50 (shown in FIG. 7) and like components are numbered similarly. As shown in FIG. 10, assembly 80 includes a pair of non-circular pressure sensor mounts 40 each having an aperture for mounting a respective pressure sensor 52 therein (mounts 40 have a non-circular shape when viewed along an axis of the sensor mount apertures such as the view shown in FIG. 10.) Moreover, pressure sensors 52 are generally spaced from one another but otherwise aligned to be relatively parallel to one another. Further, pressure sensing assembly 80 includes a pair of oil fill tubes 56 for introducing incompressible fill fluid into a plurality of distinct closed fluid volumes within the pressure sensing assembly 80.

Figure 11:
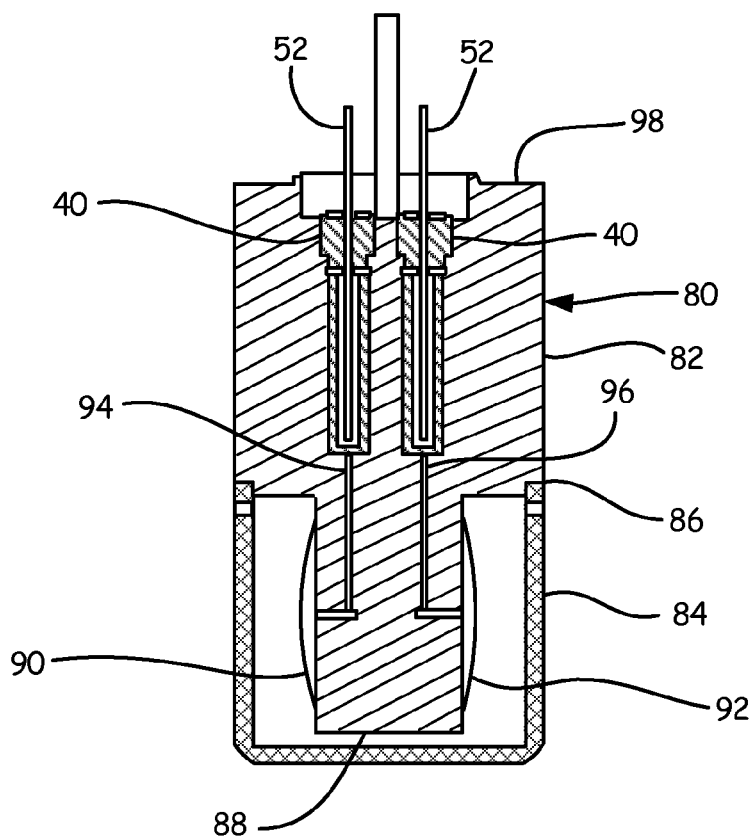
FIG. 11 is a diagrammatic cross sectional view taken along lines A-A in FIG. 10.

FIG. 11 is a diagrammatic cross sectional view of pressure sensing assembly 80 taken along lines A-A in FIG. 10. As shown, pressure sensing assembly 80 includes an isolator plug 82 that is welded to screen 84 at weld 86. A distal end 88 of isolator plug 82 has a pair of isolation diaphragms 90, 92 that are generally aligned with one another but spaced from one another in a direction transverse to their respective planes. Each isolation diaphragm 90, 92 is coupled to a respective oil passage 94, 96 that conveys process fluid pressure to pressure sensors 52. In some embodiments, each pressure sensor 52 also includes a temperature sensitive element. Additionally, in the embodiment shown in FIG. 11, there is a significant gap between each diaphragm 90, 92 and screen 84 in order to minimize or reduce the potential for hydrates (solids) to build up and affect the movement of the isolation diaphragms 90, 92.

Each pressure sensor mount 40 is preferably brazed to isolator plug 82. Further, each pressure sensor 52 is preferably soldered or otherwise affixed to its respective sensor mount. When the entire pressure sensing assembly 80 is complete, it can be attached or otherwise affixed to the probe preferably via welding at interface or surface 98.

Figure 12:
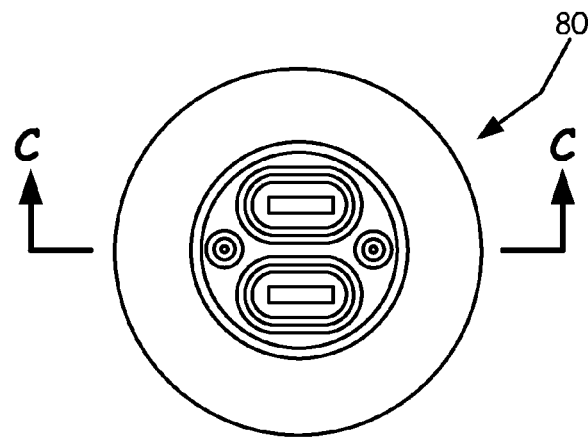
FIG. 12 is a top plan view of a pressure sensing assembly shown in FIG. 10, but rotated 90 degrees.

FIG. 12 is a top plan view of a pressure sensing assembly 80 shown in FIG. 10, but rotated 90 degrees.

Figure 13:
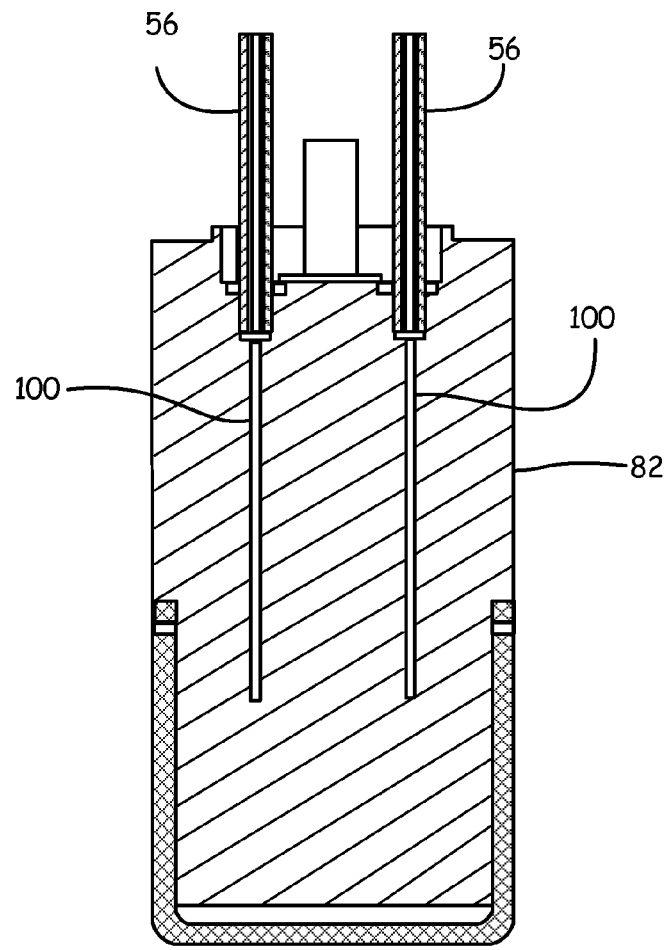
FIG. 13 is a cross sectional views of the pressure sensing assembly shown in FIG. 12 taken along lines C-C in FIG. 12.

FIG. 13 is a cross sectional view of the pressure sensing assembly shown in FIG. 12 taken along lines C-C in FIG. 12. Specifically, the cross sectional view shown in FIG. 13 is taken along lines C-C in FIG. 12 which is rotated 90° from lines A-A in FIG. 10. FIG. 13 shows each fill tube 56 attached to isolator plug 82 and conveying oil through oil passages 100 in order to fill each distinct oil-fill system. Once such systems are filled, each of oil tubes 56 is closed or otherwise sealed such that process fluid pressure bearing against respective isolation diaphragms is conveyed to respective pressure sensors. The multiple pressure/temperature measurement embodiment shown with respect to FIGS. 10-13 allows a redundant pressure measurement to be provided. In some embodiments, however, a differential pressure may be measured based on the difference between the pressures transduced by the multiple pressure/temperature sensors.

Figure 14:
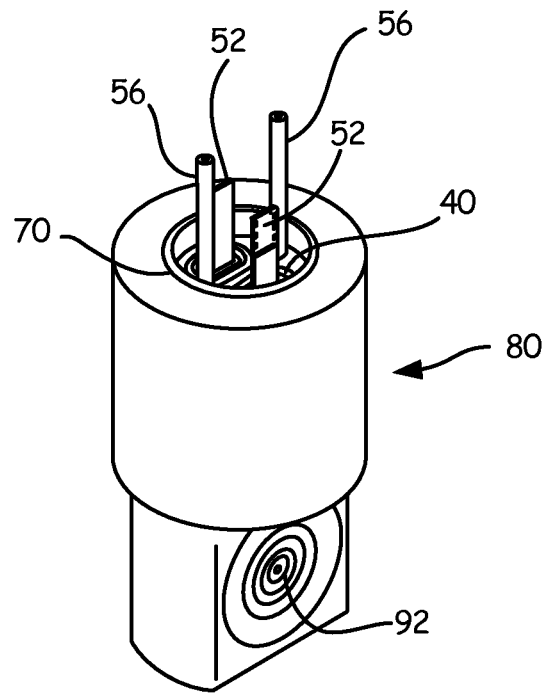
FIG. 14 is a diagrammatical perspective view of a pressure sensing assembly depicted in FIGS. 11 and 13 shown with a screen removed.

FIG. 14 is a diagrammatic perspective view of pressure sensing assembly 80 shown with screen 84 removed. As can be seen in FIG. 14, isolation diaphragm 92 is circular and includes a number of annular corrugations. The other isolation diaphragm is preferably substantially the same as isolation diaphragm 92. FIG. 14 also shows the pair of pressure sensors 52 mounted within their respective sensor mounts 40. Further still, a pair of oil fill tubes 56 are also provided and all such components can be disposed within the perimeter of ring 70.

Figure 15:
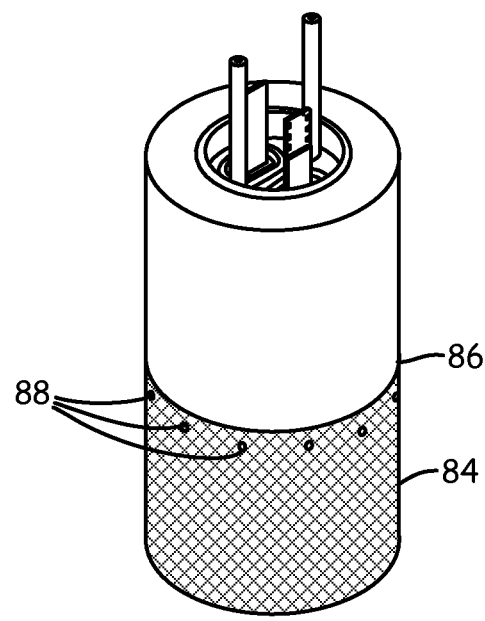
FIG. 15 is a diagrammatical perspective view of a pressure sensing assembly depicted in FIGS. 11 and 13 with a screen welded thereto.

FIG. 15 is a diagrammatic perspective view of pressure sensing assembly 80 with screen 84 welded thereto at weld 86. The overall diameter of the pressure sensing assembly 80, in accordance with embodiments of the present invention, can be as small as 0.98" (24.9 mm) based on a MWP of 20,000 psi and a suitable isolator plug material. FIG. 15 also shows a number of apertures 88 drilled or otherwise provided through screen 84 near weld 86. Apertures 88 allow gas to escape and eliminate any "dead end" that could affect pressure measurements.

As set forth above, embodiments of the present invention generally provide a small diameter pressure capsule that is suitable for subsea transmitter use via a unique sensor mount and isolator plug geometry. The length of the probe may be varied by application and is generally constructed of high-performance, high-cost materials. The pressure capsule is a key component of the probe assembly and thus drives the overall diameter. Reducing the size and diameter of the pressure capsule and probe is advantageous in reducing the overall size and cost of a subsea pressure transmitter. Opportunities to reduce the diameter of the probe will reduce the cost of the pressure transmitter by reducing the amount of high-cost corrosion resistant alloy (CRA) material required to manufacture the device. Further, the overall weight of the device will be reduced as well. Finally, embodiments of the present invention will enable other process connections beyond a standard 2¹⁄₁₆" diameter API pipe flange to be considered for some products and/or applications.

Although the present invention has been described with reference to preferred embodiments, workers skilled in the art will recognize that changes may be made in form and detail without departing from the spirit and scope of the invention. For example, with relatively minor modifications to the isolator plug, the screen could be replaced with a standard process connector and used in additional applications or environments. Additionally, with the relatively small diameter probe enabled by embodiments of the present invention, the probe could be used in a submersible pressure transmitter for groundwater or wastewater applications. Further, while embodiments of the present invention provide a pair of biplanar isolation diaphragms (shown in FIG. 11), embodiments of the present invention can be practiced in where the isolation diaphragms are coplanar.

What is claimed is:

1. A transmitter for measuring a process variable of a process field comprising:
   a housing;
   a pipe flange coupled to the housing configured to mount the transmitter to an opening in a pipe;
   a probe extending from the flange and into pipe through the opening in the pipe;
   a pressure sensor mount in the probe having an aperture therethrough;
   a pressure sensor passing through and mounted to the aperture, the pressure sensor having an electrical characteristic that varies with applied pressure;
   an isolator plug in the probe configured to be exposed to a process fluid and having a cavity formed therein which carries the pressure sensor and the pressure sensor mount therein, the isolator plug having an isolation diaphragm disposed to contact the process fluid and a passageway fluidically coupled to the isolation diaphragm to convey process fluid pressure from the isolation diaphragm to the pressure sensor through an incompressible fluid; and
   wherein the pressure sensor mount is coupled to the isolator plug and has a non-circular shape when viewed along an axis of the aperture.

2. The pressure measurement assembly of claim 1, and further comprising a fill tube coupled to the isolator plug and configured to introduce the incompressible fluid into the passageway.

3. The pressure measurement assembly of claim 2, wherein the fill tube is mounted to the isolator plug and extends from the isolator plug in a direction substantially parallel with the axis of the aperture.

4. The pressure measurement assembly of claim 1, wherein the pressure sensor mount is brazed to the isolator plug.

5. The pressure measurement assembly of claim 1, and further comprising a screen disposed over the isolation diaphragm.

6. The pressure measurement assembly of claim 5, wherein the screen is welded to the isolator plug.

7. The pressure measurement assembly of claim 1, wherein the pressure sensor is formed of a single-crystal material.

8. The pressure measurement assembly of claim 7, wherein the single-crystal material is sapphire.

9. The pressure measurement assembly of claim 1, and further comprising at least one incompressible volume insert positioned proximate a portion of the pressure sensor and disposed in the incompressible fluid.

10. The pressure measurement assembly of claim 1, wherein the assembly is embodied within a pressure probe and is part of a pressure transmitter.

11. The pressure measurement assembly of claim 1, wherein the pressure sensor further includes at least one temperature sensitive element disposed to provide an indication of process fluid temperature.

12. The pressure measurement system of claim 1, wherein the isolator plug is formed of a corrosion-resistant alloy.

13. The pressure measurement system of claim 12, wherein the corrosion-resistant alloy is C 276.

14. The pressure measurement system of claim 12, wherein the corrosion-resistant alloy is Inconel 625.

15. The pressure measurement system of claim 1, wherein the non-circular shape is substantially oval.

16. A transmitter for measuring a process variable of a process field comprising:
   a housing;
   a pipe flange coupled to the housing configured to mount the transmitter to an opening in a pipe;
   a probe extending from the flange and into pipe through the opening in the pipe;
   a first pressure sensor mount in the probe having a first aperture therethrough;
   a first pressure sensor passing through and mounted to the first aperture, the first pressure sensor having an electrical characteristic that varies with applied pressure;
   a second pressure sensor mount in the probe having a second aperture therethrough;
   a second pressure sensor passing through and mounted to the second aperture, the second pressure sensor having an electrical characteristic that varies with applied pressure;
   an isolator plug in the probe configured to be exposed to a process fluid and having first and second cavities formed therein which carry the first and second pressure sensors and the first and second pressure sensor mounts, respectively therein, the isolator plug having a first isolation diaphragm disposed to contact process fluid and including a first passageway fluidically coupled to the first isolation diaphragm to convey process fluid pressure from the first isolation diaphragm to the first pressure sensor through an incompressible fluid, the isolator plug also having a second isolation diaphragm disposed to contact process fluid and including a second passageway fluidically coupled to the second isolation diaphragm to convey process fluid pressure from the second isolation diaphragm to the second pressure sensor through an incompressible fluid; and
   wherein the first and second pressure sensor mounts are coupled to the isolator plug and have a non-circular shape when viewed along an axis of the first aperture.

17. The pressure sensor assembly of claim 16, wherein the first and second isolation diaphragms are circular.

18. The pressure sensor assembly of claim 17, wherein the first and second isolation diaphragms are spaced apart with respect to an axis of the isolator plug.

19. The pressure sensor assembly of claim 18, wherein first and second isolation diaphragms are aligned with one another.

20. The pressure sensor assembly of claim 16, and further comprising a screen coupled to the isolator plug, and wherein each isolation diaphragm is spaced from the screen.

21. The pressure sensor assembly of claim 20, wherein the screen includes a number of apertures disposed proximate an interface with the isolator plug.

22. The pressure measurement assembly of claim 16, and further comprising:
   a first fill tube coupled to the isolator plug and configured to introduce incompressible fluid into the first passageway; and
   a second fill tube coupled to the isolator plug and configured to introduce incompressible fluid into the second passageway.

23. The pressure measurement assembly of claim 22, wherein the first and second fill tubes extend from the isolator plug in a direction substantially parallel with the axis of the aperture.

24. The pressure measurement assembly of claim 22, wherein the assembly has a diameter of about 0.98" or less.

25. The pressure measurement assembly of claim 16, wherein the first and second pressure sensors are each formed of a single-crystal material.

26. The pressure measurement assembly of claim 16, wherein the non-circular shape is substantially oval.

* * * * *